(12) United States Patent
Rassaian et al.

(10) Patent No.: US 8,756,037 B2
(45) Date of Patent: Jun. 17, 2014

(54) CURVED FIBER PATHS FOR COMPOSITE LAMINATES

(75) Inventors: Mostafa Rassaian, Bellevue, WA (US); Matthew Todd Grimshaw, Seattle, WA (US); Thomas A. Grandine, Issaquah, WA (US); Matthew Steven Patterson, Seattle, WA (US); Adriana Willempje Blom, Lake Forest Park, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/164,701

(22) Filed: Jun. 20, 2011

(65) Prior Publication Data

US 2012/0323538 A1 Dec. 20, 2012

(51) Int. Cl.
*G06F 17/50* (2006.01)

(52) U.S. Cl.
CPC ............ *G06F 17/50* (2013.01); *G06F 17/5095* (2013.01)
USPC .................................................. 703/1; 703/2

(58) Field of Classification Search
USPC ...................................................... 703/1, 2, 6
See application file for complete search history.

(56) References Cited

U.S. PATENT DOCUMENTS

| | | | | |
|---|---|---|---|---|
| 6,654,710 | B1* | 11/2003 | Keller | 703/9 |
| 6,799,081 | B1 | 9/2004 | Hale et al. | |
| 6,959,269 | B1* | 10/2005 | Welterlen | 703/8 |
| 2003/0082315 | A1* | 5/2003 | Mehlman et al. | 428/16 |
| 2009/0261199 | A1 | 10/2009 | McCarville et al. | |
| 2010/0121625 | A1* | 5/2010 | Krog | 703/6 |
| 2012/0059376 | A1* | 3/2012 | Rains et al. | 606/62 |

OTHER PUBLICATIONS

A. W. Blom, M. M. Abdalla, Z. Gurdal, Optimization of Course Locations in Fiber-placed panels for general fiber angle distributions, Composite Science and Technology 70 (2010) pp. 564-570.*
A. W. Blom, P. B. Stickler, Z. gurdal, Optimization of a composite cylinder under bending by tailoring stiffness properties in circumferential direction, 2010, pp. 157-165.*
B. F. Tatting, Z. Gurdal, Automated Finite Element Analysis of Elastically-Tailored Plates, Dec. 2003, pp. 1-52.*
Blom et al, "Optimization of course locations in fiber-placed panels for general fiber angle distributions", pp. 564-570, 2009.*
Blom et al., "Optimization of Tow-Placed, Tailored Composite Laminates," 16th Int'l Conference on Composite Materials, pp. 1-8 (2007).

(Continued)

*Primary Examiner* — Shambhavi Patel
*Assistant Examiner* — Kibrom Gebresilassie
(74) *Attorney, Agent, or Firm* — Ostrager Chong Flaherty & Broitman P.C.

(57) ABSTRACT

A computational optimization process uses the variable stiffness performance of composite laminates attributed to steered fiber to guide the design of stream functions describing the fibers to build it. This design process combines a finite element-based analysis tool, failure criteria and geometry optimization to determine steered angles associated with stream functions by an optimization program to meet target performance requirements, e.g., load condition(s), and failure criteria for quasi-static or dynamic events. The fiber angle distribution and thickness buildup are computed based on the stream function. The simulated structure is analyzed using finite element analysis. The disclosed process allows the designer to impose manufacturing constraints such as fiber steering radius.

20 Claims, 8 Drawing Sheets

(56) References Cited

OTHER PUBLICATIONS

Liu et al., "A Strength-Based Multiple Cutout Optimization in Composite Plates Using Fixed Grid Finite Element Method," Composite Structures, vol. 73 (2006), pp. 403-412.

Booker et al., "A Rigorous Framework for Optimization of Expensive Functions by Surrogates," Center for Research on Parallel Computation, Rice University, CRPC-TR98739-S, Feb. 1998, pp. 1-25.

Blom et al., "Optimization of Course Locations in Fiber-Placed Panels for General Fiber Angle Distributions," Journal of Composites Science and Technology, vol. 70, No. 4 (2010), pp. 564-570.

Blom, "Structural Performance of Fiber-Placed, Variable-Stiffness Composite Conical and Cylindrical Shells," Ph.D. Thesis, Delft University of Technology, The Netherlands (2010), pp. 1-237.

Setoodeh et al., "Generating Curvilinear Fiber Paths from Lamination Parameters Distribution", 47th AIAA/ASME/ASCE/AHS/ASC Structures, Structural Dynamics, and Materials Conference, May 1-4, 2006, Newport, Rhode Island.

Keller, D. "Optimization of ply angles in laminated composite structures by a hybrid, asynchronous, parallel evolutionary algorithm", Composite Structures, vol. 92, No. 11, Oct. 1, 2010, pp. 2781-2790.

Julien M.J.F. Van Campen et al: "Generating realistic laminate fiber angle distributions for optimal variable stiffness laminates". Composites Part B: Engineering, vol. 43, No. 2, Mar. 1, 2012, pp. 354-360.

European Search Report, Application No. EP 12170244, Oct. 19, 2012.

\* cited by examiner

US 8,756,037 B2

CURVED FIBER PATHS FOR COMPOSITE LAMINATES

BACKGROUND

The methodology disclosed herein generally relates to systems and methods for producing composite laminates using tow placement technology. In particular, the methodology disclosed herein relates to the automated design of variable-stiffness composites consisting of plies with spatially varying fiber orientation.

Fiber-reinforced composite materials comprise fibers embedded in a matrix material, such as thermoset and thermoplastic polymer resins. The fibers carry loads and provide strength and stiffness. A tape layer in a composite material has high strength and stiffness in the direction of the fiber, and lower strength and stiffness in a direction perpendicular to the fiber.

Advanced fiber placement (also known as "tow placement technology") is an automated process for producing composite laminates. Multiple narrow strips (i.e., "tows") of slit prepreg tape are placed on a surface in bands of parallel tows called "courses". This technique allows fibers to be curved and tows to be cut and restarted. Where courses converge, overlaps can be eliminated by cutting and restarting tows. Constraints in the manufacturing of fiber-placed composites include a minimum turning radius and a maximum thickness build-up. Typical design practice utilizes plies in which fibers do not change direction, i.e., each fiber is straight within a ply. These designs will be referred to as "conventional" in the rest of this disclosure.

Research on fiber-reinforced composite materials with a varying in-plane fiber orientation has shown that variable stiffness can improve structural performance. The use of steered fibers in composite lay-ups is recognized as a means of tailoring the stiffness and strength in various directions to minimize the weight for the required performance of the structure. Composites consisting of plies with varying fiber orientation are called "variable-stiffness composites". In most cases, curvilinear fiber paths manufactured by tow placement are used to construct these variable-stiffness composites.

Designs have been produced which include steered-fiber plies. These approaches either have limited design spaces, or may not be manufacturable. For manufacturable designs, one-dimensional fiber path description has been used to optimize buckling load of cylindrical and conical laminates. Hypothetical designs (which may or may not be manufacturable) include: (1) alignment of fibers with principal stress directions done both analytically and experimentally; and (2) variation of fiber angles in two directions in flat panels.

These known methods for designing composite plies involve spatially varying fiber angles. Since fiber-reinforced composite materials usually comprise multiple plies, optimizations for specific loading conditions result in multiple plies with different fiber angle distributions. Steered fiber ply design approaches heretofore have typically represented fiber angle distributions directly (e.g. as Bezier surfaces) which has the drawback that for other than simple angle distributions, it is expensive to compute the thickness build-up associated with a given angle distribution. This leads either to designing potentially unmanufacturable laminates (due to excessive thickness build-up or tow cuts and adds), to the use of the limited design space of a simple angle distribution, which results in less efficient designs than would be produced in a more permissive design space, or to using a computationally expensive inverse solution to produce a stream function for measuring thickness build-up.

There is a need for methods of designing steered-fiber plies that rely on computational optimization techniques to cope with a large design space, while ensuring manufacturability.

SUMMARY

The computational optimization process disclosed herein uses the variable stiffness performance of composite laminates attributed to steered fiber to guide the design of stream functions describing the fibers to build it. This design process combines a finite element-based analysis tool (e.g., Abaqus or any other suitable finite element solver), appropriate failure criteria and geometry optimization to determine steered angles associated with stream functions by an optimization program to meet target performance requirements, e.g., load condition(s), and failure criteria for a quasi-static or dynamic event. The disclosed process further allows the designer to impose manufacturing constraints such as minimum fiber steering radius. An optimum solution is attributed to favorable stress or strain distributions for a given loaded structure with steered fibers, for example, redirecting the applied loads towards the edges of a panel, hence avoiding cutout regions where stress concentrations are critical for a given load. The stream functions determined by this analytic process are then used as target paths for fiber tow placement. The performance targets in optimization procedures range from quasi-static to dynamic response of structure. This process is applicable to finite element tools, failure criteria, and optimization programs other than the ones specified above. This process expands the design space significantly compared to one-dimensional parameterizations of fiber angle distribution, while facilitating the application of manufacturability constraints. The process can identify multiple candidate feasible designs for improved load capability. It allows weight reduction subject to constraints such as thicknesses, resulting in ideal candidate lightweight designs in significantly less time and at significantly less cost by eliminating test iterations.

One aspect of the invention is a method for designing a composite laminate, comprising: (a) selecting design variable values for a design of a first ply; (b) computing a stream function for the first ply in accordance with the selected design variable values; (c) computing a balancing ply stream function for a second ply that balances or nearly balances the first ply; (d) computing a respective fiber angle distribution of each of the first and second plies based on the respective stream functions of the first and second plies; (e) computing a thickness buildup of the first ply based on the stream function for the first ply; (f) analyzing a simulated structure of a laminate comprising first and second plies simulated by the results of the foregoing computing steps and additional plies; (g) computing one or more measures of merit for the simulated structure; and (h) iterating steps (a) through (g) until an optimum value of one or more of the measures of merit is obtained.

A further aspect of the invention is a method for producing a composite laminate, comprising: (a) selecting design variable values for a design of a ply; (b) computing a stream function for the ply in accordance with the selected design variable values; (c) computing a fiber angle distribution of the ply based on the stream function for the ply; (d) computing a thickness buildup of the ply based on the stream function for the ply; (e) analyzing a simulated structure of a laminate comprising the ply simulated by the results of the foregoing computing steps and additional plies; (f) computing one or more measures of merit for the simulated structure; (g) iterating steps (a) through (f) until an optimum value of one or more of the measures of merit is obtained; (h) determining a computer program for controlling a machine to lay courses along paths defined by the stream function which resulted in the optimum value of one or more of the measures of merit being obtained; and (i) automatically laying courses on a composite laminate in process in accordance with the computer program.

Another aspect of the invention is a system for designing a composite laminate having at least one steered-fiber ply, comprising a processor programmed to execute the following operations: (a) selecting design variable values for a design of a steered-fiber ply; (b) computing a stream function for the ply in accordance with the selected design variable values; (c) computing a fiber angle distribution of the ply based on the stream function for the ply; (d) computing a thickness buildup of the ply based on the stream function for the ply; (e) analyzing a simulated structure of a laminate comprising the ply simulated by the results of the foregoing computing steps and additional plies; (f) computing one or more measures of merit for the simulated structure; and (g) iterating steps (a) through (f) until an optimum value of one or more of the measures of merit is obtained.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

The following disclosure is the result of development and validation of an optimization process to perform design and analysis of a variable-stiffness composite shell. In the course of this work, the feasibility and weight savings potential of fiber steering for laminate structures was studied.

The design process disclosed herein allows steering the load by steering the fibers. Conventional laminates carry in-plane loads around cutouts by transferring loads between plies (e.g., from 0° plies to ±45° plies). When fibers are allowed to follow curved paths within a ply, load may be carried around cutouts more efficiently. A challenge to designing laminates with steered fibers is effectively describing manufacturable fiber paths. The potential payoff is a reduction in the weight and expense of the final manufactured structure.

Figure 1:
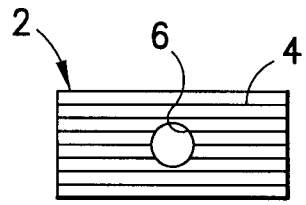
FIG. 1 is a diagram representing a ply of conventional composite material having straight fibers and a cutout.

For a conventional ply on a flat panel, the fiber paths are described entirely by the ply angle. For conventional laminates, the ply angle is one of 0°, ±45°, 90°. FIG. 1 shows a ply 2 made of composite material with straight fibers 4 that are mutually parallel. Other plies, not shown in FIG. 1, lie atop the ply 2. The resulting laminate is shown with a circular cutout 6, which may be formed by milling after the lay-up of plies has been cured. The load path goes from this 0° ply to an adjacent 45° ply (not shown) to get from the fibers that end at the cutout 6 to the fibers that go by and do not intersect the cutout.

A generalization of conventional laminates, called "non-traditional" laminates, allows the straight-fiber plies to lie at any angles.

Figure 2:
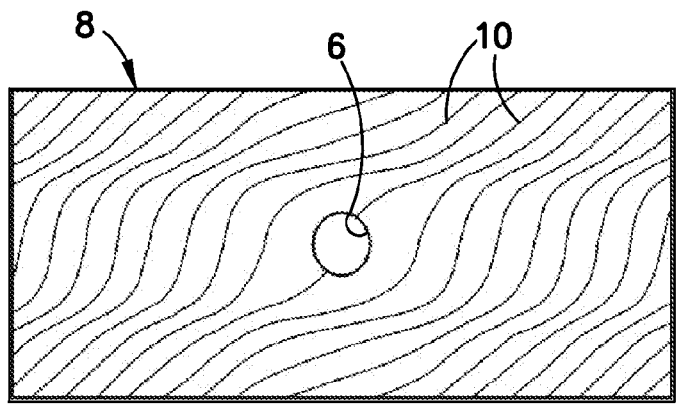
FIG. 2 is a diagram representing a ply of composite material having steered fibers and a cutout.

A further generalization is "steered-fiber" or "variable stiffness" laminates in which fiber paths may curve within a ply. FIG. 2 shows a ply 8 made of composite material with steered fibers 10 which follow curved paths. Other plies, not shown in FIG. 2, lie atop the ply 8. The resulting laminate is shown with a circular cutout 6. As seen in FIG. 2, there are still some fibers that end at the cutout 6 in this steered-fiber ply, but other fibers make it around the cutout. The steered fibers produce spatially varying stiffness and strength, the net effect of which is a more efficient structure.

Steered fibers take curved paths in the ply, and those paths must be described somehow. A great variety of fiber paths is possible, but they must also follow certain rules to be manufacturable: (1) paths must not curve too much (too small steering radii cause wrinkles); and (2) paths must not converge too much (thickness buildup or tow cuts/adds result). Fiber path curvature (or steering radius) and convergence can be controlled relatively easily for some simple path descriptions. The design process disclosed herein enables a more complex (and robust) path description that allows control over these manufacturability constraints. Whatever the path description, most approaches to designing steered-fiber plies rely on optimization techniques to cope with a large design space of steered paths. The process disclosed herein offers an extended design space while ensuring manufacturability, which is a necessity for practical design.

Another design challenge involves structural analysis methods. Structures may not be designed without a method of predicting their strength (and structural efficiency depends on accuracy of the method). There is a need for analysis methods applicable to slit tape. In particular, work is required for production application of steered fibers, for example, to deal with tow cuts and additions mid-ply and effects of fiber curvature.

An existing solution for designing a steered-fiber ply is disclosed in the thesis of A. W. Blom entitled "Structural Performance of Fiber-Placed, Variable-Stiffness Composite Conical and Cylindrical Shells" (2010). This solution involves a primary optimization loop in which design variables are chosen, the fiber angle distribution is defined, the thickness buildup is computed, the structure is analyzed, and the measures of merit of the structure are computed. Inside the primary optimization loop is a secondary optimization loop, which is required to calculate a stream function, which in turn is required for computation of the thickness distribution. The secondary optimization loop comprises choosing boundary conditions for a partial differential equation, solving the partial differential equation to derive the stream function, computing the thickness distribution, and computing the acceptability of the thickness distribution.

In contrast, in the design process disclosed herein, the design variables directly define the stream function, so the secondary optimization loop is not required. With the stream function defined, the thickness distribution and fiber angle distribution are easily computed from the stream function. The stream function itself can be parameterized straightforwardly, for example, by tensor product polynomial splines.

Figure 3:
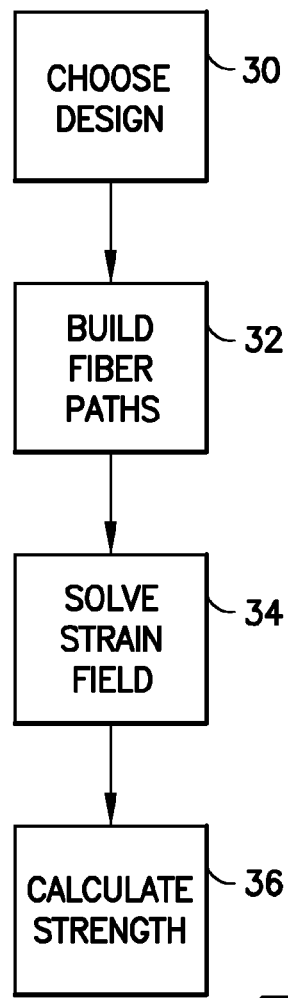
FIG. 3 is a flowchart reflecting an iteration of the design process disclosed herein.

FIG. 3 is a flowchart reflecting an iteration of the design process disclosed herein. In step 30, a design is selected by the optimization program based on current knowledge of the design space. Then the optimization program hands the design parameters to a program (step 32 in FIG. 3) that processes parametric geometry and then formats the data for finite element analysis. In step 34, the finite element analysis program solves for the strain field under given loads. Then in step 36, the finite element analysis program post-processes the strain field to calculate panel strength based on these results. The structural analysis is driven by the optimizer and automated using scripting. The scripts can be used to distribute data for parallel runs on different computers of a high-performance computing cluster if one is available. Parallel finite element analysis runs result in significant time saving.

Figure 4:
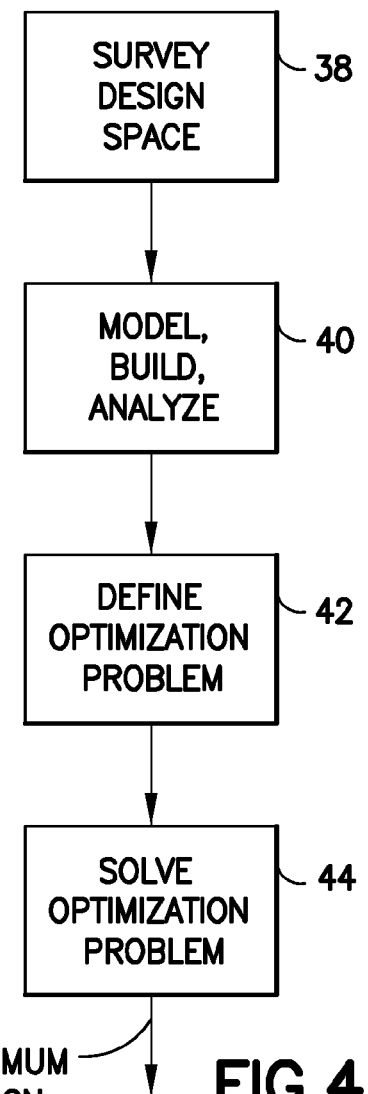
FIG. 4 is a flowchart representing steps of the optimization process in accordance with an embodiment.

FIG. 4 is a flowchart representing the major steps of the optimization process in accordance with one embodiment of the invention. The design space is surveyed (step 38) by the optimization program. An experiment is designed to gather response data on the design space for an initial approximate model (e.g., 162 initial Abaqus runs). This includes defining the domain (specification of input parameters, output responses and bounds on the parameters) and defining the experiment (definition of an experiment based on a Design of Experiments that gives statistical data concerning the samples that will yield the maximum information). Then surrogate models are built, which will allow the optimization algorithm to make inferences about the merit of various structures in the design space (step 40). Thereafter the optimization problem is defined (step 42). Then the optimization problem is solved (step 44) using an algorithm that uses the approximate models to judiciously choose points at which to run the finite element analysis program, and periodically uses the results of these finite element analyses to improve the approximate model. This process is iterated until completion of the optimization.

One suitable algorithm for optimization when using computer simulations in engineering decision-making is disclosed in Booker et al., "A Rigorous Framework for Optimization of Expensive Functions by Surrogates", CRPC-TR98739-S, Center for Research on Parallel Computation, Rice University, February 1998. However, to design curved fiber paths for variable-stiffness composite laminates, any suitable known optimization program can be employed.

Optimization is computationally intensive. An embodiment of the methodology disclosed herein may reduce optimization run times by formulating the optimization problem carefully (by transforming response functions, tuning optimization parameters, etc.), taking advantage of parallel computing and using a high-performance computing cluster. Parallelizing the process allows many analyses to run simultaneously, substantially reducing total design time.

Figure 5:
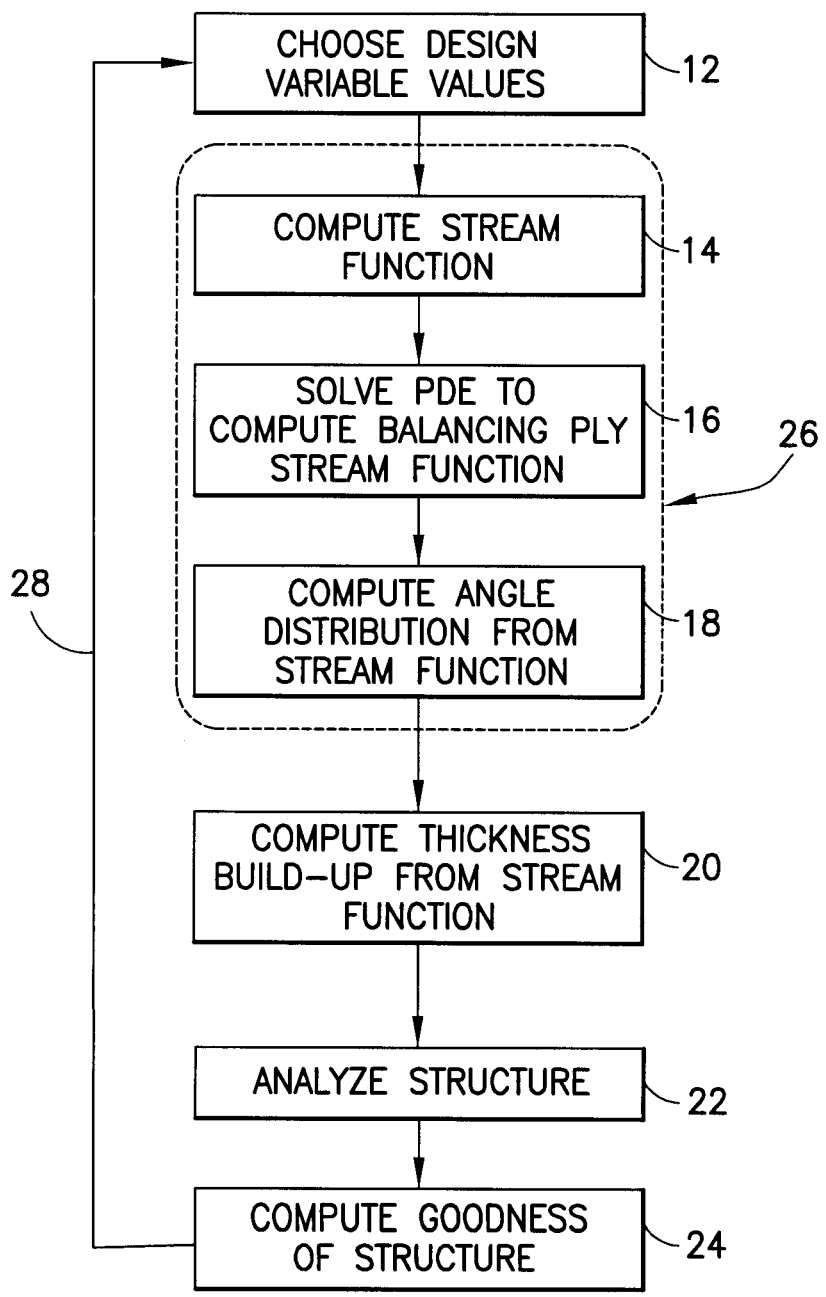
FIG. 5 is a flowchart detailing a design process in accordance with one embodiment.

FIG. 5 is a flowchart detailing a design process in accordance with one embodiment. First, design variable values are selected which directly define the stream function (step 12). The stream function can be parameterized using, for example, tensor product polynomial splines. The angle distribution is then defined (sub-process 26) by computing the stream function (step 14), solving a partial differential equation to compute the balancing ply stream function (step 16), and computing the angle distribution for each stream function (step 18). Also the thickness buildup is computed from one stream function (step 20) since the thickness buildup is the same for each ply of a balanced pair. The steering radius can be computed alongside the thickness build-up in step 20 (both measures are functions of the derivatives of the stream function). Steps 14, 16, 18 and 20 are performed by a computer programmed to process parametric geometry. The structure simulated by the results of the foregoing computing steps is then analyzed in step 22 by a finite element analysis program, such as Abaqus. The measure of merit is computed (step 24) for the simulated structure using a subroutine that plugs into the finite element analysis program. The foregoing steps are iterated until the best value of the measure of merit is obtained. Arrow 28 indicates the optimization loop by which new design variable values are are iteratively chosen as a function of the results of the measure of merit computations until an optimal design is obtained. The constraints on the steering radius and thickness build-up are applied by the optimizer, which is represented in FIG. 5 by arrow 28 and step 12, that is, the future choices of design variable values are influenced by whether or not the steering radius and thickness build-up for a given design were acceptable. When an optimal design is obtained, that optimal design can be converted into a program to be executed by a controller of a computer numerical control tow placement machine. The controller is programmed to cause the tow placement machine to lay fibers along paths defined by the stream function which resulted in the acceptable value of the measure of merit being obtained.

The flowchart shown in FIG. 5 describes the design of the ply as a continuous angle distribution. In a separate phase of design, the angle distribution is discretized for manufacturing.

To simulate manufacturing parameters, the ply design process disclosed herein includes the following constraints.

First, the steering radius must be limited to avoid fiber wrinkling. Fiber steering requires in-plane bending of a tow, causing local buckling or wrinkling on the inside periphery of a curved tow when the steering radius becomes small. Fibers on the inside of a small radius will wrinkle because they take a shorter path than the outer fibers. Large enough radii should be used in the design to avoid wrinkling.

Figure 6:
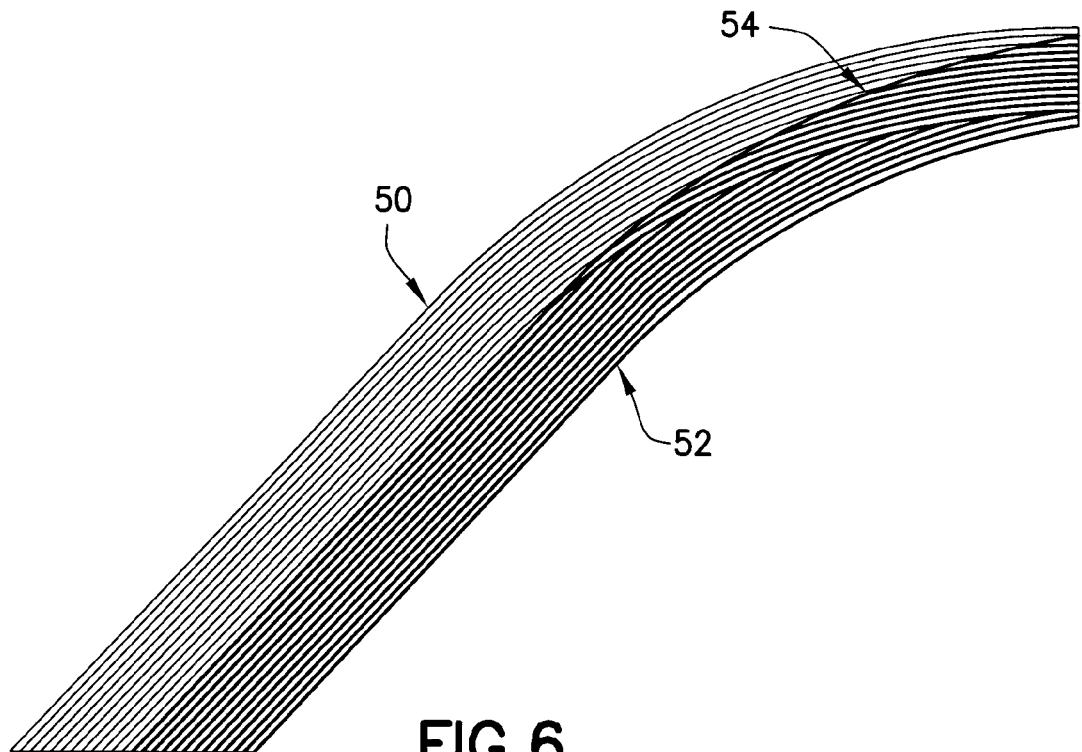
FIG. 6 is a diagram showing convergent courses which overlap.
Figure 7:
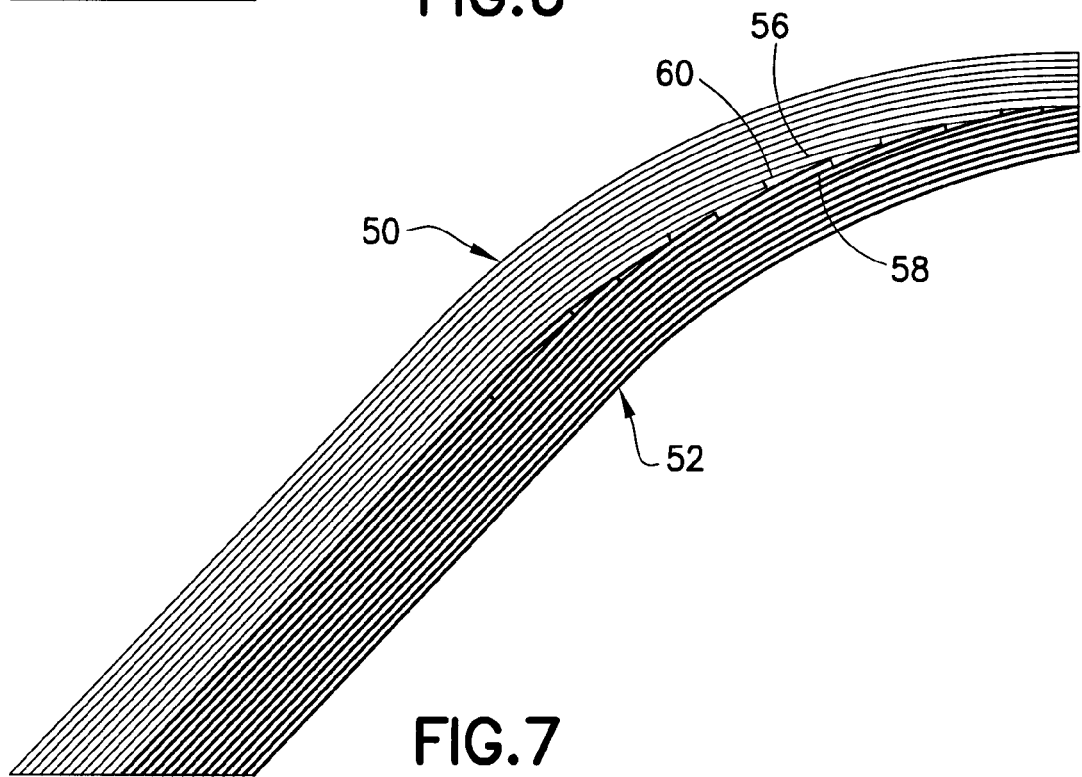
FIG. 7 is a diagram showing convergent courses which have been cut to leave wedge-shaped gaps in the lay-up.

Second, thickness buildup, or cut tows, should be limited. Where the design calls for fiber courses to converge, thickness buildup in the laminate will result. FIG. 6 shows a pair of courses 50 and 52 which converge to produce an area of overlap 54. The overlap will cause thickness to build up unless tows are cut (or added) for relief. FIG. 7 shows a pair of courses 50 and 52 having tows 56 and 58 respectively, which have been cut, leaving wedge-shaped gaps 60 in the lay-up. Buildup and cut-gaps can both be reduced by limiting course convergence in the ply design.

Figure 8:
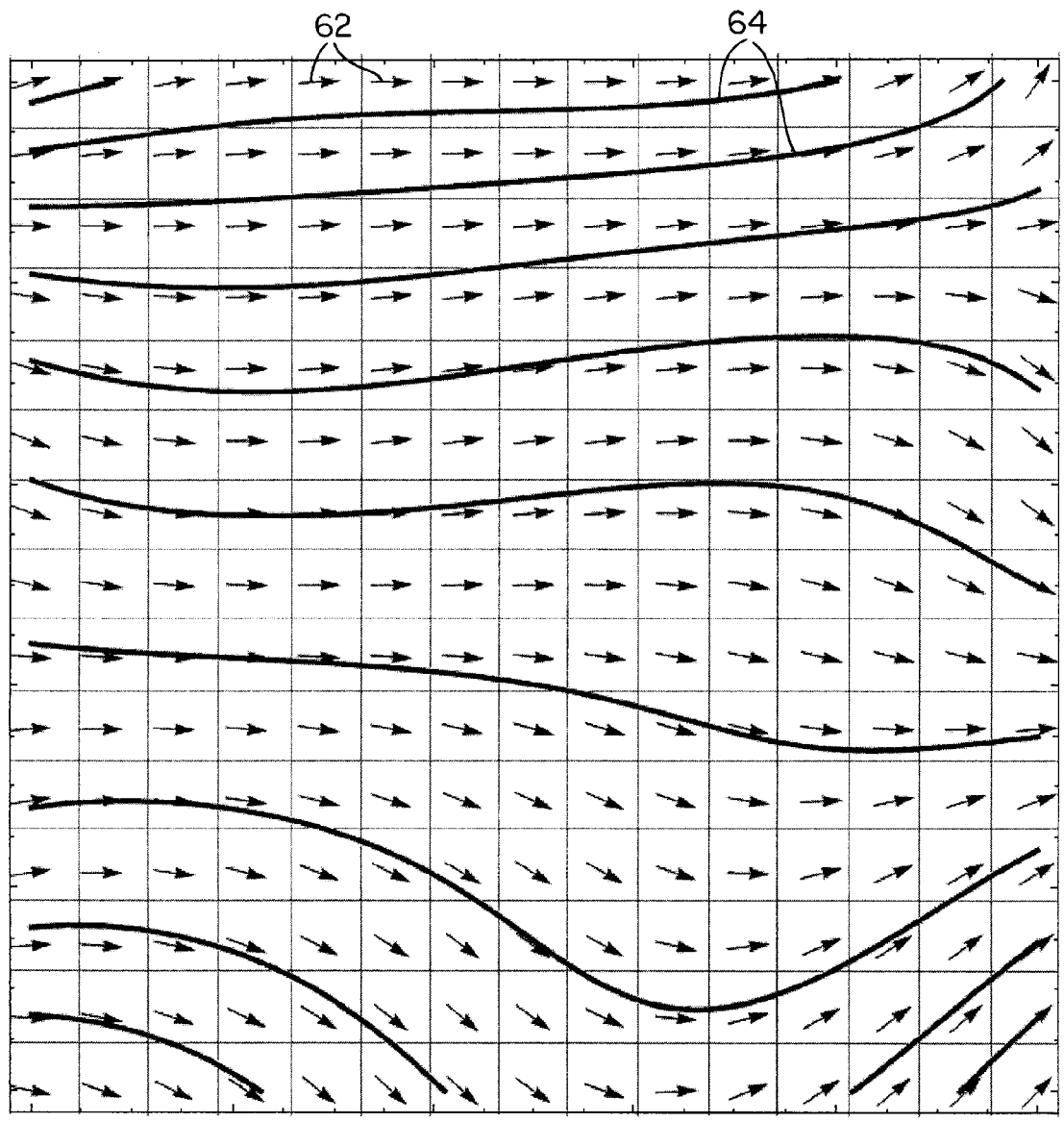
FIG. 8 is a diagram showing a direction field (i.e., fiber orientation variation) of a steered-fiber ply.

In accordance with one embodiment, fibers in a steered-fiber panel are placed in strips called tows, which tows are ⅛" wide, and several tows are laid down together in a course, 12 tows per course. Each discrete course path could be described separately, but for design a steered-fiber ply is typically treated instead as a direction field. FIG. 8 is a diagram showing a direction field (i.e., fiber orientation variation) of a steered-fiber ply. The arrows 62 in FIG. 8 represent the direction field (each arrow shows the direction of a fiber going through that point). The solid lines 64 represent fiber paths. Each fiber path extends from one end of a respective course to the other end.

Mathematically, the direction field of a steered-fiber ply can be described as a vector-valued function in the plane of the ply. Fiber direction fields can also be described by the local angle a fiber makes with a ply axis. This leads to a scalar-valued function. Directly describing the angle distribution as a function of a single direction variable has been previously done successfully. Angle distributions as functions of both directions, however, lead to problems controlling thickness buildup and steering radius.

FIG. 5 Fiber angle distributions in a plane may be represented by any scalar-valued functions in the plane. If the angle distribution is a function of both directions in the plane, then the angle representation can be represented for example by a Bezier surface, which has 16 control points as design parameters. The Bezier surface maps 16 numbers to a continuous surface, the height of the surface defining the local ply angle.

Once a fiber angle distribution is defined, the thickness buildup due to course convergence can be determined and then a stream function representation of the direction field is determined. Finding such a stream function is not trivial—the solution is not unique for a given direction field, and an iterative numerical procedure is required. One such procedure is disclosed in Blom et al., "Optimization of Course Locations in Fiber-Placed Panels for General Fiber Angle Distributions", Composites Science and Technology, 70(4), 564-570 (2010).

Figure 9:
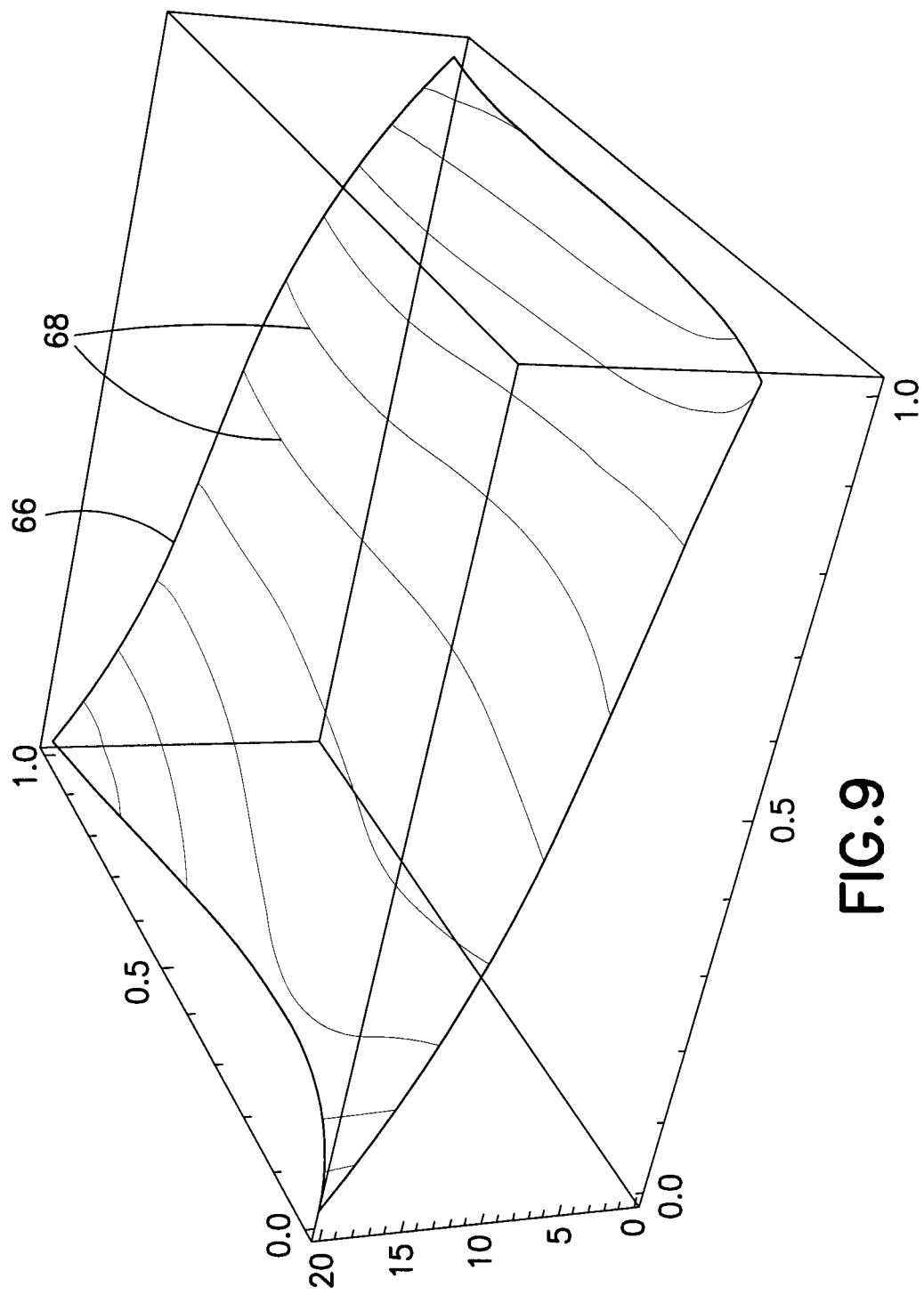
FIG. 9 is a diagram showing a stream function representation of fiber paths of a steered-fiber ply.

Alternatively, rather than finding a stream function which fits a chosen fiber angle distribution, the stream function may be chosen (i.e., parameterized) directly, and then the angle distribution is calculated from the stream function. This is the methodology adopted herein. The surface 66 shown in FIG. 9 represents a stream function, and its contours 68 are streamlines. Instead of representing fluid flow paths, the streamlines represent fiber paths. As used herein, a "fiber path" follows the centerline of a finite-width course. Thickness buildup occurs where the streamlines 68 get close together. Curvature and thickness buildup can both be described mathematically as functions of the gradient of the stream function.

Figure 10:
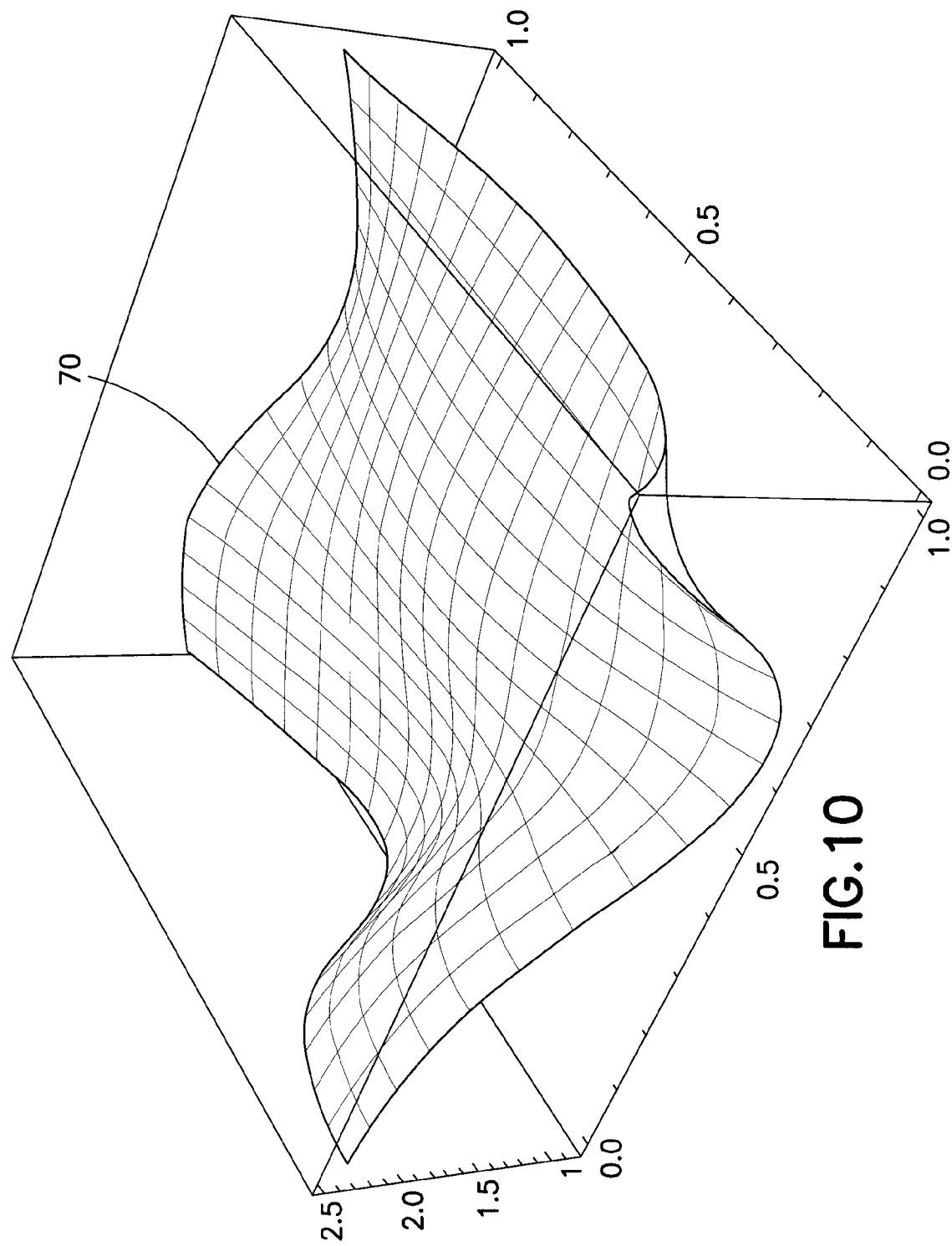
FIG. 10 is a diagram representing the fiber angle distribution for the stream function depicted in FIG. 9.

One advantage of the stream function representation of fiber paths is that both thickness buildup and steering radius, which are related to derivatives of the stream function, can be controlled more directly. FIG. 10 shows a surface 70 which represents fiber angles directly. It is much easier (and cheaper) to calculate the angle distribution shown in FIG. 10 from the stream function shown in FIG. 9 than vice versa.

This disclosure proposes the use of a scalar-valued function $\phi$ of two variables as a means of representing a manufacturing plan for a particular ply. This works because individual tape courses can be represented as contours of $\phi$. In particular, the j-th tape course can be determined by finding the contour corresponding to $$\phi(x,y)=j\delta \tag{1}$$

for some $\delta$ which is a function of the tape width and the scaling of the function $\phi$.

Candidate functions $\phi$ necessarily have to satisfy restrictions on the spacing of the tape courses as well as their curvature. Suppose that the width of the tape is given by w. If the constraint $$1-\epsilon_1 \leq \|\nabla(x,y)\| \leq 1+\epsilon_2 \tag{2}$$

is imposed on $\phi$ for all values of x and y and $\delta$ is set equal to w, then the spacing between tape courses will necessarily be constrained to lie between $w(1-\epsilon_1)$ and $w(1+\epsilon_2)$.

Curvature is more difficult to deal with. Suppose that a toolpath is parameterized by u such that the points (x(u),y(u)) all satisfy $$\phi(x(u),y(u))=j\delta \tag{3}$$

Differentiating this with respect to u yields $$\phi_x x' + \phi_y y' = 0. \tag{4}$$

where $\phi_x$ is presumed to be the partial derivative of $\phi$ with respect to x and $\phi_y$ is similarly defined. Equation (4) says that the tangent to the tape course at any point is perpendicular to the gradient of $\phi$. Since the parametric velocity of the toolpath was arbitrary to begin with, one can simply take $$\begin{pmatrix} x' \\ y' \end{pmatrix} = \begin{pmatrix} \varphi_y \\ -\varphi_x \end{pmatrix} \tag{5}$$

as the definition of the points (x(u),y(u)). If one differentiates Eq. (5), one gets $$\begin{pmatrix} x'' \\ y'' \end{pmatrix} = \begin{pmatrix} \varphi_{xy} x' + \varphi_{yy} y' \\ -\varphi_{xx} x' - \varphi_{xy} y' \end{pmatrix} = \begin{pmatrix} \varphi_{xy}\varphi_y - \varphi_{yy}\varphi_x \\ -\varphi_{xx}\varphi_y + \varphi_{xy}\varphi_x \end{pmatrix} \tag{6}$$

Applying the standard definition of curvature, one gets $$\kappa(x,y) = \frac{\varphi_{yy}\varphi_x^2 - \varphi_{xx}\varphi_y^2}{(\varphi_x^2 + \varphi_y^2)^{3/2}}. \tag{7}$$

Note that curvature is a signed quantity here, since we are working in two dimensions. Bounds on curvature can be imposed with the constraint $$\kappa_l \leq \kappa(x,y) \leq \kappa_u. \tag{8}$$

Suppose that one wants to balance a ply defined by $\phi$ with another one defined by $\psi$. In this case, balance means that the fiber directions given by $\psi$ are the same as those given by $\phi$ after they have been reflected about some preferred direction d. Suppose that d is given by the unit vector $(d_1,d_2)$. If one has a vector v, then the reflection of this vector about d is given by $$\tilde{v}\psi = 2(v \cdot d)d - v. \tag{9}$$

Since reflecting the fiber directions given by $\phi$ is equivalent to reflecting the gradient of $\phi$ (reflecting a vector about a direction is equivalent to reflecting its normal about the direction), one gets $$\nabla\psi = 2(\nabla\phi \cdot d)d - \nabla\phi. \tag{10}$$

Equation (10) says that the gradient of $\psi$ is some given function of x and y, i.e., it is a partial differential equation of the form $$\nabla u = f(x,y). \tag{11}$$

Differential equations of this form are integrable (have solutions) precisely when the curl of $f$ vanishes everywhere $$\nabla \times f = 0. \tag{12}$$

Applying the curl to the right-hand side of Eq. (10) and setting it equal to zero leads to the condition $$d_1 d_2 (\phi_{xx} - \phi_{yy}) + (d_1^2 - d_2^2)\phi_{xy} = 0. \tag{13}$$

In other words, this condition means that in order for the ply given by $\phi$ to be balanced by ply $\psi$ given preferred direction d, the function $\phi$ must be a solution to the partial differential equation given by Eq. (13). Thus, parametric definitions of plies given by $\phi$ which can be structurally balanced need to be sought among solutions to Eq. (13) which also satisfy Eqs. (2) and (8).

Figure 11:
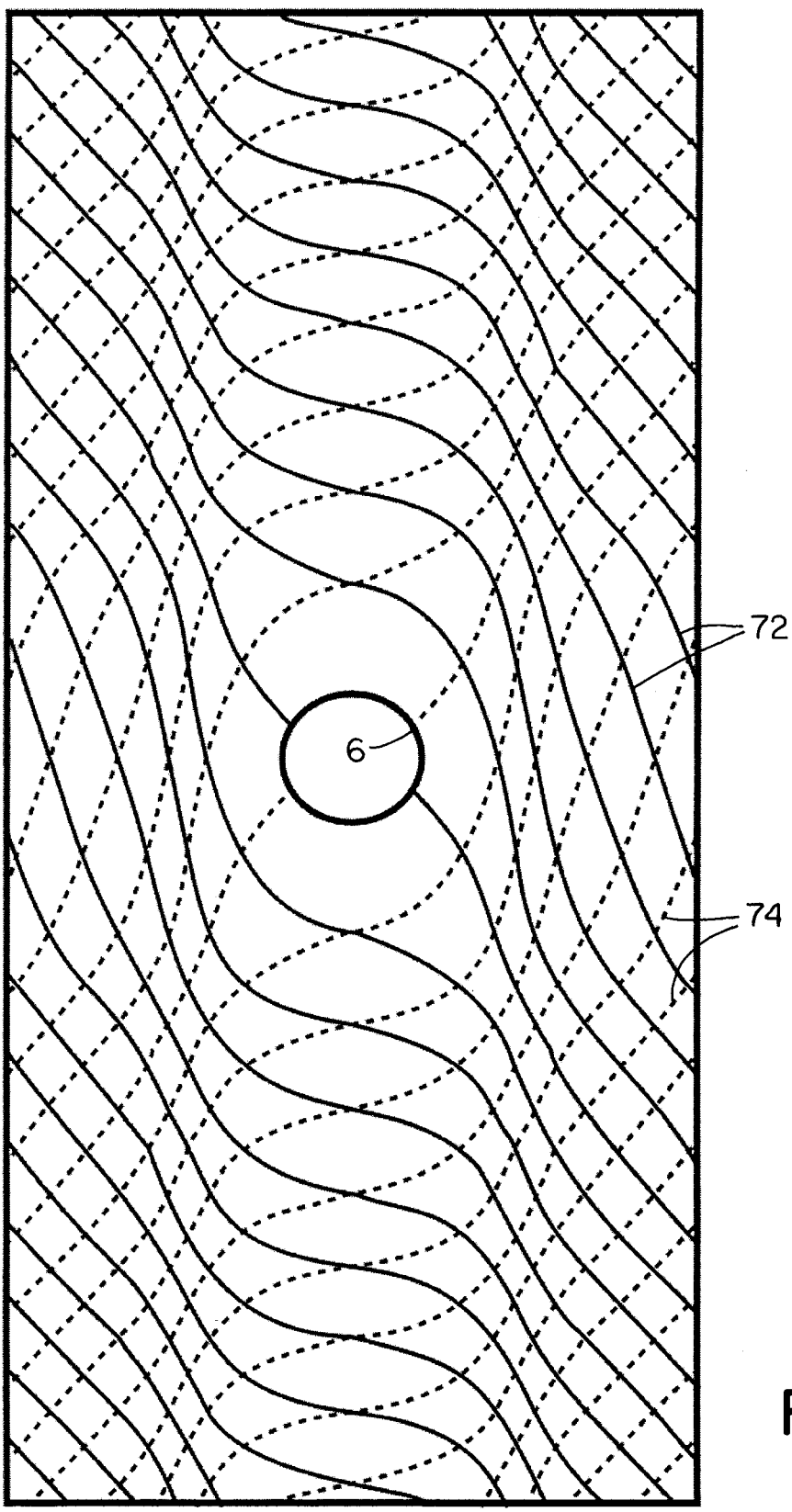
FIG. 11 is a diagram showing typical fiber paths for two steered plies of a balanced laminate composite.

FIG. 11 shows typical fiber paths for two plies of a balanced composite laminate. The solid contours 64 represent the fiber paths of a first ply, while the dashed contours 66 represent the fiber paths of a second ply which balances the first ply. Wherever the solid and dashed contours intersect, they have opposite angles from the vertical (primary load) axis.

Remark 1. Suppose one has a spline function φ which is a numerical solution to Eq. (13). Then the function ψ can be computed analytically in a straightforward manner as in the following pseudo-code:

xphi=phi.Differentiate (0)
yphi=phi.Differentiate (1)
dprod=2.0*(d1*xphi+d2*yphi)
xpsi=d1*dprod−xphi
ypsi=d2*dprod−yphi
psitemp=xpsi.Integrate (0)
correction=(ypsi−psitemp.Differentiate (1)).Integrate (1)
psi=psitemp+correction Remark 2: Some simple solutions to Eq. (13) can be found by observing that the equation will be satisfied whenever $\phi_{xy}=0$ and $\phi_{xx}=\phi_{yy}$. The condition $\phi_{xy}=0$ implies that φ is of the form $\phi(x,y)=f(x)+g(y)$. The condition $\phi_{xx}=\phi_{yy}$ coupled with this condition means that $f''(x)=g''(y)$. The only way this can happen is if f and g are quadratic polynomials with identical constants in front of the quadratic terms. Since the constant term does not matter, this means that $$\phi(x,y)=a(x^2+y^2)+bx+cy \quad (14)$$

will always satisfy Eq. (13). This provides a three-parameter family of plies which can be structurally balanced.

Remark 3: If the preferred direction d is either horizontal or vertical, then Eq. (13) simplifies to $\phi_{xy}=0$. In other words $$\phi(x,y)=f(x)+g(y) \quad (15)$$

will work for any univariate functions f and g. Thus, in this special case, simple solutions can be obtained without having to restrict f and g to quadratic polynomials.

Remark 4: If the preferred direction d is ±45°, then Eq. (13) simplifies to $$\phi_{xx}=\phi_{yy}, \quad (16)$$

the simplest second-order linear wave equation. These solutions can be easily characterized.

For example, let $\phi(x,y)=x \cos y$. Then $\phi_x(x,y)=\cos y$ and $\phi_y(x,y)=-x \sin y$. So we need to solve the differential equation $$\frac{dy}{dx}=-\frac{\cos y}{x \sin y}.$$

The general solution, obtained by conventional techniques, turns out to be cos y=cx, where c is an arbitrary constant. Solving for c, we get $$c=\frac{\cos y}{x},$$

which says that the sought function ψ is $$\psi(x, y) = \frac{\cos y}{x}.$$

Referring back to FIG. 5, the design variable values may be chosen in step 12, for example, by selecting a, b and c in Eq. (14). The stream function is computed in step 14 by evaluating the expression on the right-hand side of Eq. (14). The balancing ply stream function is computed in step 16 by solving the partial differential equation set forth in Eq. (10). The angle distribution is computed from the stream function in step 18 using Eq. (5). Once the stream function is found, thickness buildup can be calculated (step 20) as a function of a gradient of the stream function in well-known manner (see, e.g., Blom et al., "Optimization of Course Locations in Fiber-Placed Panels for General Fiber Angle Distributions", Composites Science and Technology, 70(4), 564-570 (2010)).

Figure 12:
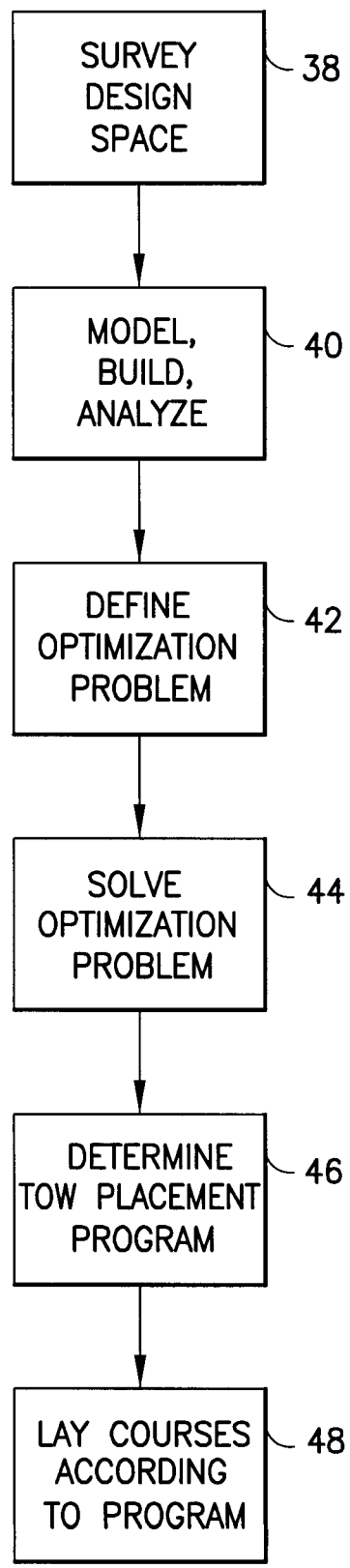
FIG. 12 is a flowchart representing the major steps of a process for producing a steered-fiber ply designed in accordance with the process disclosed herein.

FIG. 12 is a flowchart representing the major steps of a process for producing a steered-fiber ply designed in accordance with the process previously described. Steps 38, 40, 42 and 44 are the same as previously described with reference to FIG. 4. The design space is surveyed (step 38) by the optimization program. An experiment is designed to gather response data on the design space for an initial approximate model. Then surrogate models are built, which will allow the optimization algorithm to make inferences about the merit of various structures in the design space (step 40). Thereafter the optimization problem is defined (step 42). Then the optimization problem is solved (step 44) using an algorithm that uses the approximate models to judiciously choose points at which to run the finite element analysis program, and periodically uses the results of these finite element analyses to improve the approximate model. This process is terminated when a computed stream function is determined that qualifies as an optimum design for the steered-fiber ply to be produced. This optimum stream function is then converted into a computer program for controlling a multi-axis computer numerical control tow placement machine (step 46). When this program is executed to add a steer-fiber ply during lay-up of a composite laminate, respective courses are precisely placed (i.e., laid) along lines corresponding to the streamlines of the optimum stream function (step 48). This is done using a robotic tow placement head, the structure of which is well known in the art. The courses are cut at the end of each traverse and the head is reset for the next run.

As is well known, a composite panel may be constructed with multiple (e.g., 20) plies. For a conventional ply on a flat panel, each ply has fiber paths which are described entirely by ply angles selected from the group consisting of 0°, ±45° and 90°. One exemplary steered-fiber composite panel may have four steered plies, with the other plies being of the conventional variety. For example, pairs of 0° plies or ±45° plies in a conventional panel may be replaced with pairs of steered-fiber plies, the plies of each pair being balanced. The steered-fiber plies of each pair may be separated by one or more intervening conventional plies. This proposed laminate structure is merely exemplary. Simulations have shown that a fiber-steered panel with cutout has reduced peak strain and strain is increased away from the cutout, i.e., more load is carried away from the hole. With 20% of conventional plies replaced by steered-fiber plies, the predicted load-carrying capability was in one instance increased 17%. Thus, to achieve the same load-carrying capability, a composite laminate having steered-fiber plies can result in a significant weight reduction as compared to conventional laminates.

The design variables in the process disclosed herein design an individual ply, or by extension a balanced pair. More variables can be added to design more plies, similarly. The structural analysis, however, upon which the optimization/design process depends only makes sense for the laminate in toto, and so while the design is defined in terms of plies, the design process itself works on a laminate.

The design process disclosed herein can be useful in the design of single (unbalanced) plies, as well as in the design of balanced pairs of plies. Another possibility is the design of pairs of nearly balanced plies, by adding small unbalancible terms to the stream function definition (i.e., adding a function of x and y to Eq. (15)).

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The following method claims should not be construed to require that the recited steps be performed in alphabetical order or in the order in which they are recited.

What is claimed is:

1. A method for designing a composite laminate containing steered-fiber plies defined by stream functions, comprising the following steps:
    (a) choosing values of parameters of a stream function for a first ply as design variable values that define the stream function of the first ply;
    (b) computing a stream function for a second ply that structurally balances the first ply, the stream function for the second ply being computed as a function of the design variable values chosen in step (a);
    (c) computing a respective fiber angle distribution of each of the first and second plies based on the respective stream functions for the first and second plies;
    (d) computing a thickness buildup of each of said first and second plies based on the stream functions for said respective first and second plies;
    (e) analyzing a simulated structure of said laminate comprising at least the first and second plies simulated by results of steps (b) through (d);
    (f) computing one or more measures of merit for the simulated structure; and
    (g) iterating steps (a) through (f) until an optimum value of one or more of the measures of merit is obtained,
    wherein steps (b) through (g) are performed by processors.

2. The method as recited in claim 1, wherein said design variable values chosen in step (a) specify courses having steered fibers of radius greater than a lower limit.

3. The method as recited in claim 1, wherein said design variable values chosen in step (a) specify courses having thickness buildup due to overlap of said courses less than an upper limit.

4. The method as recited in claim 1, wherein step (e) comprises performing a finite element analysis.

5. The method as recited in claim 1, wherein step (e) comprises solving for a strain field for the simulated structure under unit load and processing said strain field to calculate a strength of said laminate based on unit-load results.

6. The method as recited in claim 1, wherein steps (b) through (g) are performed by each of a plurality of processors operating in parallel.

7. The method as recited in claim 1, wherein each of the first and second plies is designed to have a respective cutout.

8. The method as recited in claim 1, further comprising programming a controller of a computer numerical control tow placement machine with instructions that will cause the tow placement machine to lay tows of a ply along paths defined by the stream function for the first ply which resulted in the optimum value of one or more of the measures of merit being obtained.

9. The method as recited in claim 1, further comprising storing on a computer-readable medium data representing a manufacturing plan for a particular ply, said manufacturing plan comprising the stream function for the first ply which resulted in the optimum value of one or more of the measures of merit being obtained.

10. A method for producing a composite laminate, comprising:
    (a) choosing values of parameters of a stream function for a ply as design variable values that define the stream function of the ply;
    (b) computing a fiber angle distribution of the ply based on the stream function for the ply;
    (c) computing a thickness buildup of the ply based on the stream function for the ply;
    (d) analyzing a simulated structure of said laminate comprising at least the ply simulated by the results of steps (b) through (d);
    (e) computing one or more measures of merit for the simulated structure;
    (f) iterating steps (a) through (e) until an optimum value of one or more of the measures of merit is obtained;
    (g) writing a computer program for controlling a machine to lay courses at fiber angles along paths defined by streamlines computed based on the stream function which resulted in the optimum value of one or more of the measures of merit being obtained; and
    (h) automatically laying said courses in accordance with said computer program,
    wherein steps (b) through (f) are performed by processors.

11. The method as recited in claim 10, wherein said design variable values chosen in step (a) specify courses having steered fibers of radius greater than a lower limit.

12. The method as recited in claim 10, wherein said design variable values chosen in step (a) specify courses having thickness buildup due to overlap of said courses less than an upper limit.

13. The method as recited in claim 10, wherein step (d) comprises performing a finite element analysis.

14. The method as recited in claim 10, wherein step (d) comprises solving for a strain field for the simulated structure under unit load and processing said strain field to calculate a strength of said laminate based on unit-load results.

15. The method as recited in claim 10, wherein steps (b) through (f) are performed by each of a plurality of processors operating in parallel.

16. The method as recited in claim 10, wherein the ply is designed to have a cutout.

17. The method as recited in claim 10, further comprising programming a controller of a computer numerical control tow placement machine with instructions that will cause the tow placement machine to lay courses along paths defined by the stream function which resulted in the optimum value of one or more of the measures of merit being obtained.

18. The method as recited in claim 10, further comprising storing on a computer-readable medium data representing a manufacturing plan comprising the stream function for the ply which resulted in the optimum value of one or more of the measures of merit being obtained.

19. A system for designing a composite laminate having at least one steered-fiber ply, comprising: one or more processors programmed to execute the following operations:
  (a) choosing values of parameters of a stream function for a ply as design variable values that define the stream function of the ply;
  (b) computing a fiber angle distribution of the ply based on the stream function for the ply;
  (c) computing a thickness buildup of the ply based on the stream function for the ply;
  (d) analyzing a simulated structure of a laminate comprising at least the ply simulated by the results of steps (b) through (d);
  (e) computing one or more measures of merit for the simulated structure;
  (f) iterating steps (a) through (e) until an optimum value of one or more of the measures of merit is obtained.

20. The system as recited in claim 19, wherein each stream function comprises a multiplicity of contour lines representing respective course paths of a respective steered-fiber ply design.

\* \* \* \* \*